Jan. 12, 1954

F. A. REIP 2,665,614

WORK DIVIDING ATTACHMENT

Filed Nov. 25, 1949

INVENTOR.
FRANK A. REIP
BY
John J. Lynch
Atty.

Patented Jan. 12, 1954

2,665,614

UNITED STATES PATENT OFFICE 2,665,614

WORK DIVIDING ATTACHMENT

Frank A. Reip, Brooklyn, N. Y.

Application November 25, 1949, Serial No. 129,339

3 Claims. (Cl. 90—57)

This invention relates to dividing means and in particular to one adapted for home workshop use.

A particular object of the invention is to provide a dividing attachment for use in what is commonly termed indexing or the turning of work step by step in predetermined increments so that graduations can be marked thereon or points set off to locate work to be done such as drilling.

A further object of the invention is to provide a dividing device which is intended for use in small tool-rooms and shops and for home work-shop use to take the place of make-shift devices that are employed instead of expensive indexing equipment that can not be afforded by the average experimenter.

Other objects are to provide a simplified indexing attachment that can be mounted in association with lathe parts and which is adjustable so that it can be used in several different types and sizes of lathes; to provide a device of the character referred to that is simple to set up and use, makes use of a minimum number of holes, can be used for several forms of indexing or dividing and can be produced at small cost.

With these and other objects in view, the invention comprises certain construction hereinafter described and then particularly pointed out in the claims and a preferred embodiment of my invention is illustrated in the accompanying drawing in which:

Figure 1:
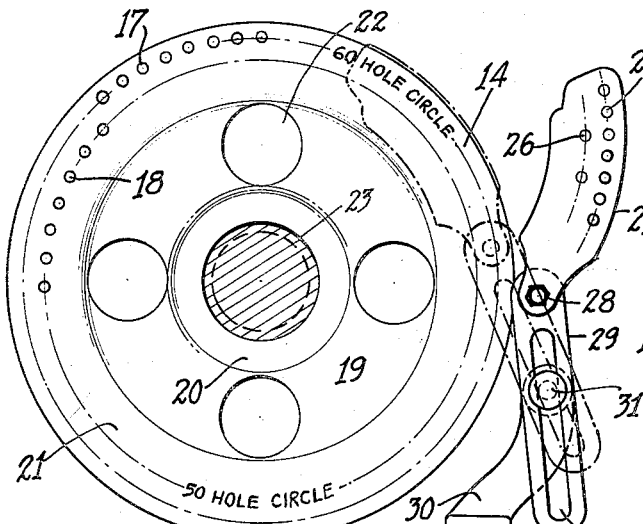
Figure 1 is a view in elevation looking toward a dividing ring mounted in a lathe together with the segmental vernier that coacts therewith.

Referring to the drawing in detail, 10 indicates the head of a lathe or other machine tool from which protrudes a spindle 11 having a threaded arbor portion 12 for receiving a chuck 13 so that a dividing ring of plate or disc form 14, forming a part of my invention, can be clamped about the arbor and between the ends of the chuck and the spindle to revolve therewith. The chuck 13 carries the work 15 in the well known manner and in position to be marked by a tool 16 that may be fixed to the frame of the machine for manual movement relatively to the work.

Figure 2:
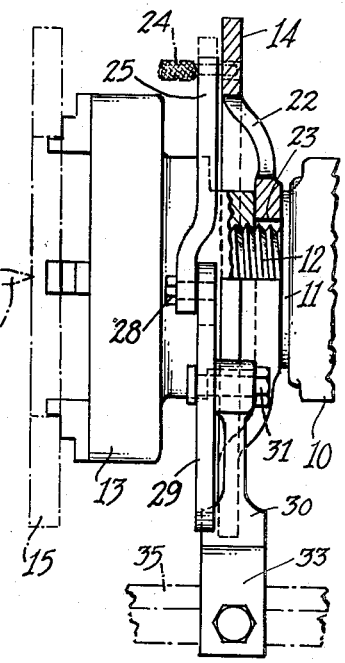
Figure 2 is a view in side elevation of the device illustrated in Figure 1, parts being broken to illustrate the mounting of the various members of the device.
Figure 5:
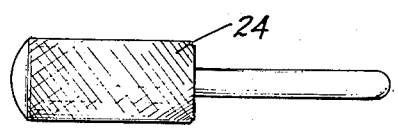
Figure 5 is an enlarged side view of a pin used in conjunction with the vernier and the ring.

As shown in Figures 1 and 2 the plate 14, which will hereafter be generally referred to as a ring, is provided with two concentric circles of holes, the outer circle containing sixty holes 17 which are spaced six degrees apart and the inner circle containing fifty holes 18 which are spaced seven degrees twelve minutes apart. The holes are bored horizontally from the side face of the plate. The plate or ring is provided with a dished central portion 19, bounded by the inner and outer oppositely machined areas 20 and 21 respectively, and holes 22 for clearance of chuck holding bolts. The area 20 is provided with a central hole 23 which is closely machined to fit snugly over the spindle and be firmly held for rotation therewith. The machined surface of area 21 permits close fit therewith of the segment vernier so that an aligning pin 24 (Figure 5) can quickly and easily drop into the aligned hole in the ring.

The vernier comprises a segment 25 having inner and outer radii conforming substantially to the respective radii of the outer area 21 of the ring 14 as shown in outline in Figure 1. The segment is pierced with two rows of holes 26 and 27, the radii of the center lines of the rows being respectively the same as the radii of the center lines of the holes of the inner circle 18 and the outer circle 17 of the ring 14. The spacing of the two holes 26 is ten degrees forty-eight minutes or one and one half times the spacing of adjacent holes 18. As each hole 26 in the segment is aligned sequentially with the ring holes 18 the ring can be moved one hundredth of a circumference and likewise the work 15. The holes 27 in the segment are five degrees apart and as the pin is inserted in sequence therein and engages the ring-hole the ring and work move one degree.

The segment 25 is pivotally connected, by an adjusting screw 28, to the upper end of an arm 29 which is pivotally and longitudinally adjustable with respect to a bracket portion 30 to which it is attached by a bolt 31 fixed in the bracket and passing through a slot 32 in the arm. The bracket 30 is formed integrally with a base 33 which, by screw 34 may be adjustably secured to the side frame 35 of a lathe. Through the medium of the adjustable parts of the vernier, the device may be employed universally with lathes of different styles and sizes.

Figure 3:
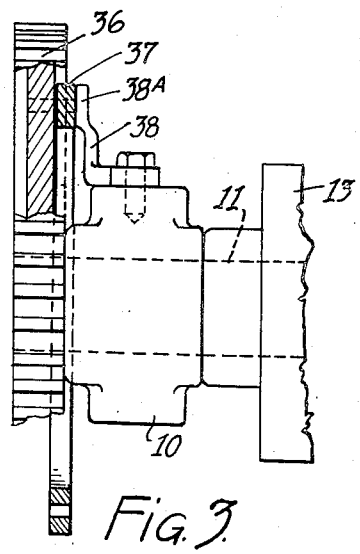
Figure 3 is a fragmentary part of a machine shown in side elevation and to which my novel dividing device is applied.

In Figure 3 a lathe gear 36 is shown to which is attached, in any suitable manner, a ring 37 having annular rows of holes corresponding to the holes 17 and 18 of the ring 14. A vernier bracket 38 secured to a fixed portion of the lathe is provided with a vernier segment portion 38A having holes corresponding to the holes 26 and 27 of segment 25. Through the manipulation of the gear and pin 24 the same result can be obtained as with the device shown in Figs. 1 and 2.

Figure 4:
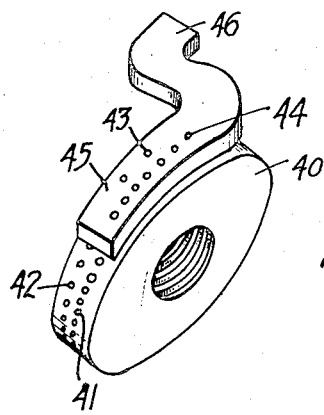
Figure 4 is a view in perspective of a ring and vernier combination that may be employed with the lathe structure shown in Figure 1.

In Figure 4 a ring 40 having two rows of holes 41 and 42 and a vernier segment 45 having two rows of holes 43 and 44 arranged as above described show the use of the device in a ring where it is more convenient to provide the holes on the periphery of the ring as where the latter is used as the chuck-back of a chuck as well understood in lathe work. The vernier 45 is secured by its offset portion 46 to an adjacent stationary part of the head of the lathe, or to arm 29 for use with bracket assembly 30.

It is quite evident that the simplified vernier and ring combination with the hole arrangement can be employed in a number of ways and the same results will be obtained whether the indexing holes are in a horizontal or vertical plane. They can be used in a plain ring fastened to the back of factory threaded chucks or other equipment and the vernier may be a permanent or semi-permanent part of the lathe or machine tool in which the work is handled.

My invention is not to be restricted to the precise details of construction shown since various changes and modifications may be made therein without departing from the scope of the invention or sacrificing the advantages to be derived from its use.

What I claim is:

1. The combination with a machine tool having a work rotating member and a stationary portion; of dividing means for limiting the rotary movement of the work in predetermined increments comprising a ring mounted for rotatable movement with the work, and having on one face thereof a plurality of rows of holes the holes of each row being spaced different distances apart, a vernier member having a row of holes to match each of the rows of holes on the ring and the holes of each row in said vernier member being spaced apart different distances, a pin for sequentially aligning the holes matching rows in the vernier and ring to rotate the work different increments of rotary movement, a base for supporting the vernier and means for adjustably mounting the vernier on said base for movement toward and away from said ring.

2. The combination with a machine tool having a work rotating member and a stationary portion; of dividing means for limiting the rotary movement of the work in predetermined increments comprising a ring having a plurality of rows of openings therein, a vernier comprising a segment conforming in shape to a segmental peripheral area of said ring and having rows of holes therein to correspond with said ring openings, a base bracket for mounting the vernier adjacent said ring, an arm having bolt in a slot connection to said bracket and to which said vernier is pivoted and a pin for aligning the holes of the vernier and the ring to step off distances of movement of the work.

3. A dividing means of the character set forth in claim 2 in which said ring is provided with inner and outer machined areas and a central dished portion having openings therein for mounting the ring on a lathe spindle.

FRANK A. REIP.

References Cited in the file of this patent

UNITED STATES PATENTS

| Number | Name | Date |
| --- | --- | --- |
| 935,345 | Wiebke | Sept. 28, 1909 |
| 1,365,826 | Hendrickson | Jan. 18, 1921 |
| 2,341,099 | Hillman | Feb. 8, 1944 |
| 2,452,544 | Brodie | Nov. 2, 1948 |

FOREIGN PATENTS

| Number | Country | Date |
| --- | --- | --- |
| 188,576 | Great Britain | Nov. 16, 1922 |